United States Patent [19]

Schoene et al.

[11] Patent Number: 5,623,860
[45] Date of Patent: Apr. 29, 1997

[54] ADJUSTABLE/BYPASSABLE BEVEL STOP FOR COMPOUND MITER SAW

[75] Inventors: Keith R. Schoene, St. Charles; Daniel A. Terpstra, Kirkwood; Richard B. Brundage, Ladue; Frank J. Tomiser, Jr., St. Louis, all of Mo.

[73] Assignee: Emerson Electric Co., St. Louis, Mo.

[21] Appl. No.: 356,518

[22] Filed: Dec. 15, 1994

[51] Int. Cl.$^6$ ............................ B23D 45/14; B27B 5/20
[52] U.S. Cl. .................... 83/471.3; 83/473; 83/477.1; 83/581; 83/564; 83/490
[58] Field of Search ........................ 83/471.3, 473, 83/477.1, 581, 483, 491, 564, 490

[56] References Cited

U.S. PATENT DOCUMENTS

| | | | |
|---|---|---|---|
| 2,422,843 | 6/1947 | Mooradian | 83/447.1 X |
| 2,704,560 | 3/1955 | Woessner | 83/473 X |
| 3,302,669 | 2/1967 | Edler | 83/471.3 |
| 4,011,782 | 3/1977 | Clark et al. | 83/581 X |
| 4,152,961 | 5/1979 | Batson | 83/471.3 X |
| 4,452,117 | 6/1984 | Bricker et al. | 83/581 X |
| 4,641,557 | 2/1987 | Steiner et al. | 83/581 X |
| 4,934,233 | 6/1990 | Brundage et al. | 83/397 |
| 5,042,348 | 8/1991 | Brundage et al. | 83/471.3 |
| 5,063,805 | 11/1991 | Brundage | 83/468.3 |
| 5,181,448 | 1/1993 | Terpstra | 83/468.3 |
| 5,216,964 | 6/1993 | Sato et al. | 83/581 X |
| 5,235,889 | 8/1993 | Brickner et al. | 83/581 X |
| 5,404,779 | 4/1995 | Break | 83/471.3 X |
| 5,425,294 | 6/1995 | Ushiwata et al. | 83/471.3 X |
| 5,437,214 | 8/1995 | Sasaki et al. | 83/471.3 X |

FOREIGN PATENT DOCUMENTS 000570904  11/1993  European Pat. Off. ............ 83/581

*Primary Examiner*—Rinaldi I. Rada
*Assistant Examiner*—Boyer Ashley
*Attorney, Agent, or Firm*—Polster, Lieder, Woodruff & Lucchesi

[57] ABSTRACT

A compound miter saw with an adjustable/bypassable bevel stop is disclosed. The compound miter saw includes a turntable rotatably mounted on a supporting frame. A power driven saw blade is pivotally mounted to the turntable and moves along a predetermined path from an upper raised to a lower operational position that includes a saw blade slot in the turntable. A bevel adjusting features selectively rotates the power driven saw blade relative to the turntable. The adjustable/bypassable bevel stop includes predetermined bevel stop settings at set angles, for example, such as 0° and 45°, as well as an over-riding feature when angles either less than or greater than the predetermined bevel stop settings are desired. The over-riding feature does not require re-adjustment of the predetermined bevel stop settings.

11 Claims, 4 Drawing Sheets

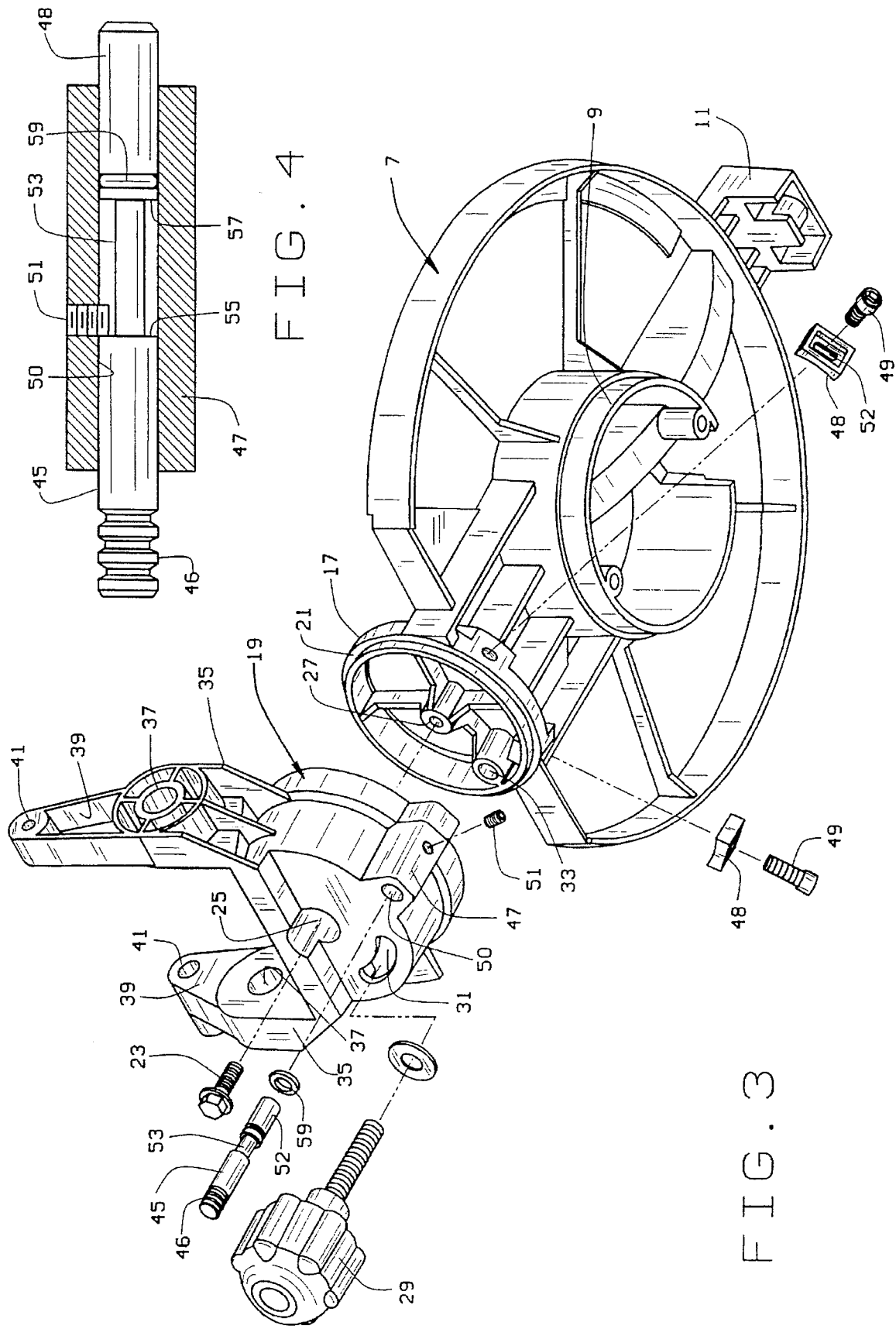

ADJUSTABLE/BYPASSABLE BEVEL STOP FOR COMPOUND MITER SAW

BACKGROUND OF THE INVENTION

The present invention relates to a compound miter saw with an adjustable/bypassable bevel stop for predetermined bevel stop settings while allowing the saw to be beveled beyond the stops if greater angles are required.

Compound miter saws which have incorporated miter and bevel cutting features have met with substantial commercial success. These compound miter saws provide miter and bevel cutting of wood, metals and plastics for use in a variety of industries. Examples of such compound miter saws are shown in U.S. Pat. Nos. 4,934,233; 5,042,348; 5,061,805; and 5,181,448. All of the above mentioned compound miter saws provide a number of improved features that have been usefully employed in the manufacture and use of such saws.

The present invention relates to compound miter saws of the aforementioned type which have been further improved to provide an adjustable/bypassable bevel stop. The above identified patents disclose typical constructions for bevel settings over a wide range of angles. It has been found that bevel cutting is typically desired at 0° where no bevel cut takes place and 45° which is another typical predetermined setting. At the same time, it would be desirable to adjust the bevel settings to angles less than 0° and greater than 45° without in any way disturbing the predetermined bevel stop settings. As will be seen from the discussion that follows, the present invention provides an adjustable/bypassable bevel stop feature for predetermined bevel stop settings while also allowing beveling to take place beyond the predetermined settings if greater angles are required. This is further accomplished without re-adjusting the predetermined bevel stop settings.

SUMMARY OF THE INVENTION

Among the several objects and advantages of the present invention include:

The provision of a new and improved adjustable/bypassable bevel stop which provides fixed bevel stop settings while allowing beveling to occur beyond the predetermined bevel stop settings if greater angles are required;

The provision of the new and improved adjustable/bypassable bevel stop in which the predetermined bevel stop settings can be over-ridden if angles less than or greater than the predetermined stop settings are required without re-adjusting the predetermined bevel stop setting;

The provision of the new and improved adjustable/bypassable bevel stop wherein the bypassable feature is accomplished by pulling a pin to bypass the fixed stops for angles greater than and less than 45° and 0° respectively;

The provision of the new and improved adjustable/bypassable bevel stop which provides adjustable fixed stop settings;

The provision of the aforementioned new and improved adjustable/bypassable bevel stop which provides a simple, inexpensive and practical mechanism which provides adjustable fixed bevel stop settings by loosening fastener for movement of the adjustable fixed stops; and The provision of the aforementioned adjustable/bypassable stop which is strong, durable, made of a minimum number of parts, readily adaptable to current manufacturing techniques, easy to use, easy to install and is otherwise well adapted for the purposes intended.

Briefly stated, the compound miter saw with the adjustable/bypassable stop includes a turntable rotatably mounted on a supporting frame. The turntable includes a saw blade slot that extends through an upper planar surface. A power driven saw blade is pivotally mounted to the turntable and moves along a predetermined path from an upper raised position to a lower operational position that includes a saw blade slot in the turntable. Bevel adjustment means are provided for selectively rotatably moving the power driven saw blade relative to the turntable. The adjustable/bypassable bevel stop is constructed for predetermined bevel stop settings at set angles as well as for over-riding such bevel stop settings when an angle either less than or greater than the predetermined bevel stop settings is desired without re-adjusting the bevel stop means.

The normal bevel stop settings are typically 0° and 45°; however, the adjustable/bypassable stop means of the present invention enables the bevel stop settings to be bypassed for angles less than or greater than the 0° and 45° without re-adjusting the bevel stop means.

The bevel adjustment means includes a fixed cylinder section mounted at one end of the turntable which extends generally transverse to the upper planar surface of the turntable. A movable cylinder section is rotatably mounted relative to the fixed cylinder section in order to enable the bevel adjustment means to selectively rotatably move the movable cylinder section relative to the fixed cylinder section and provide bevel adjustment of the power driven saw blade relative to the turntable. The adjustable/bypassable bevel stop means works in cooperation with the fixed cylinder section and movable cylinder section.

Specifically, the adjustable/bypassable stop means includes bevel stops mounted on the fixed cylinder sections at 0° and 45° for engaging an index pin mounted on the movable cylinder section when the bevel adjustment means is operated. The index pin is movable to a position of disengagement relative to the bevel stops for bevel adjustment beyond the bevel stops. The index pin is retained in a circumferential support provided on the movable cylinder section.

The index pin is retained in the circumferential support while being longitudinally movable between an engaged and non-engaged position relative to the bevel stops. A fastener, preferably a set screw, extends through the circumferential support and is located in a recessed area of the index pin between spaced shoulders which define the range of movement between engaged and non-engaged positions relative to the bevel stops. An 0-ring is mounted about the index pin for frictional engagement with the circumferential support in order to hold the index pin in the desired engaged or non-engaged position.

These and other objects of the present invention will become apparent from the description that follows.

BRIEF DESCRIPTION OF THE DRAWINGS

In the drawings.

FIG. 3 is an exploded rear perspective view of the various components constituting the adjustable/bypassable stop of the present invention;

FIG. 4 is a sectional view of an index pin showing the manner in which it is moved from engaged to non-engaged position relative to bevel stops;

Corresponding numerals will be used throughout the several figures of the drawings.

The following detailed description illustrates the invention by way of example and not by way of limitation. This description will clearly enable one skilled in the art to make and use the invention and describes several embodiments, adaptions, variations, alternatives and uses of the invention, including what we presently believe is the best mode of carrying out the invention.

Figure 1:
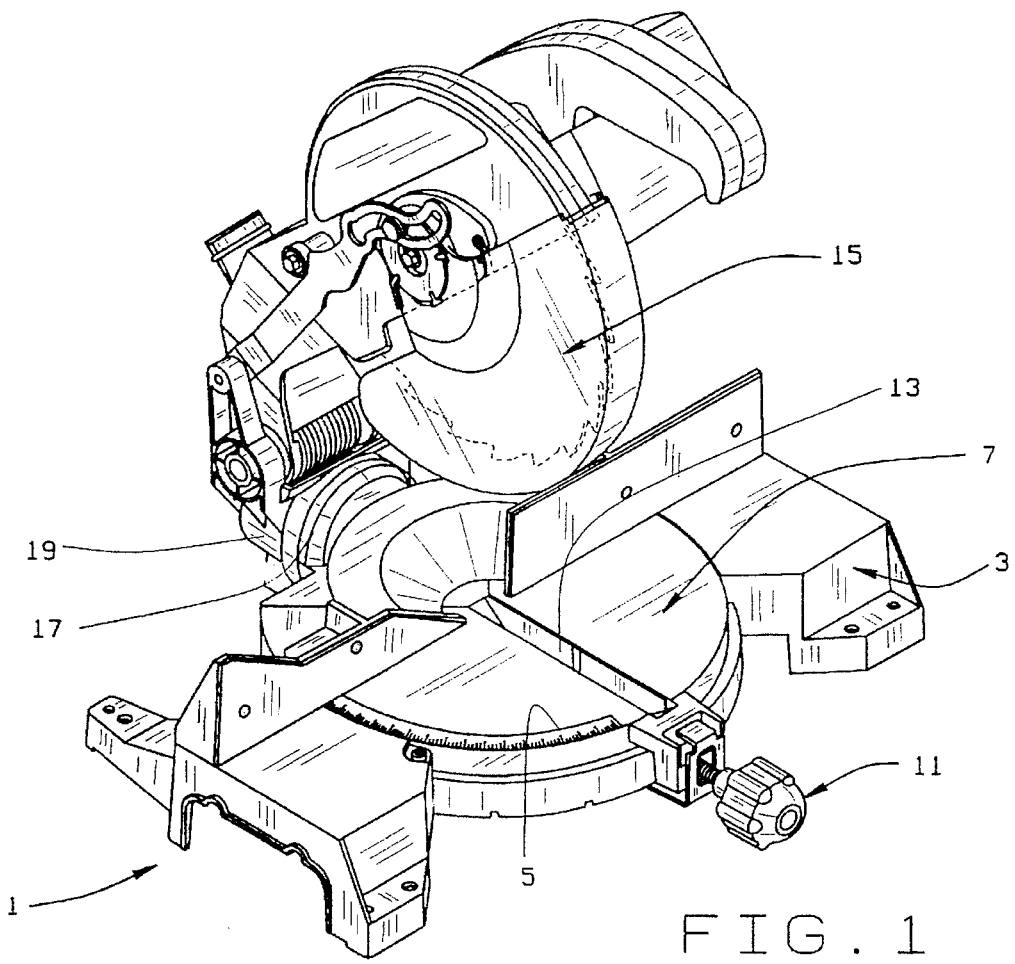
FIG. 1 is a front perspective view of a typical compound miter saw which can incorporate the adjustable/bypassable bevel stop of the present invention.
Figure 2:
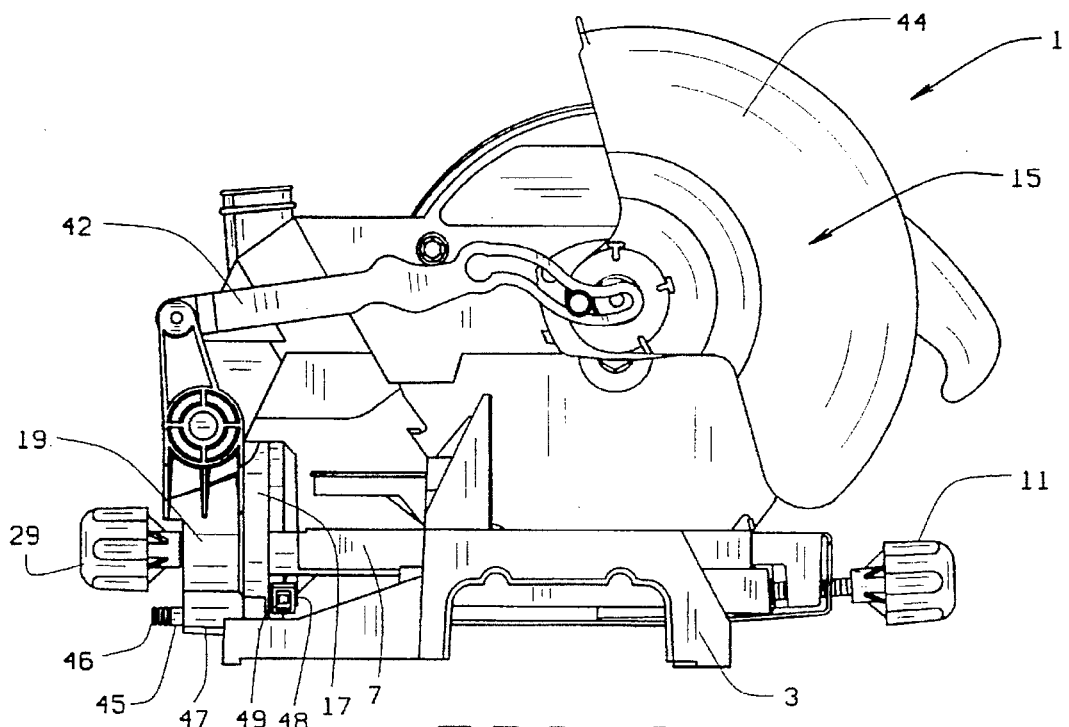
FIG. 2 is a side elevational view of the compound miter saw shown in FIG. 1 with the adjustable/bypassable bevel stop of the present invention.

As best seen in FIGS. 1-2 of the drawings, the general features of the compound miter saw 1 include a supporting frame 3 having an arcuate miter scale 5 at an upper front position for ease of use and visibility by the user. A turntable 7 is selectively rotatably mounted within the supporting frame or base 3, such as through the central collar 9 of the turntable 7 as shown in FIG. 3 of the drawings. A miter lock handle 11 is constructed to selectively rotate the turntable 7 relative to the supporting frame 3 in order to position the turntable 7 in the desired miter setting, as shown by the miter scale 5.

The turntable 7 includes a saw blade slot for receiving the power driven saw blade 15. The power driven saw blade 15 is pivotally mounted on the turntable 7 such that when the turntable 7 is rotated, the power driven saw blade 15 is moved along with it in order to maintain alignment between the power driven saw blade 15 and the turntable slot 13, as will be apparent. The power driven saw blade 15 is pivotally mounted to the movable cylinder section 19 for movement between an upper at rest position and a lower operational position where it cooperates with the saw blade slot 13 for engaging and cutting a workpiece in the desired manner. All of the above features are generally disclosed in the above mentioned patents, and reference is made to such patents for a specific description of the above described components.

For the specific manner in which the power driven saw blade 15 is mounted to the turntable 7 in the present invention, reference is made to FIG. 3 of the drawings. There, it will be seen that a fixed cylinder section 17 is integrally formed or otherwise associated relative to the turntable 7 at its rear end. The fixed cylinder section 17 is cooperatively and rotatably mounted relative to a movable cylinder section 19 for selective rotatable adjustment of the movable cylinder section 19 relative to the fixed cylinder section 17. The movable cylinder section 19 is sized to slidably fit over the cylindrical section 21 of the fixed cylinder section 17 for rotatable movement of the movable cylinder section 19 relative to the fixed cylinder section 17. A threaded fastener 23 extends through an opening 25 in the movable cylinder section 19 for engagement with the integral upstanding boss 27 of the fixed cylinder section 17, in order to secure the movable cylinder section 19 relative to the fixed cylinder section 17, without inhibiting rotation between such sections. A threaded element with enlarged head or knob 29 extends through the arcuate slot 31 in the movable cylinder section 19 for threaded engagement with the upstanding boss 33 in the fixed cylinder section 17. Loosening of the enlarged head threaded element 29 enables the cylinder section 19 to be adjusted about the arcuate slot 31 to a desired bevel setting, following which the enlarged head threaded element 29 is threaded into the upstanding boss 33 for limiting movement of the movable cylinder section 19. Clamping the enlarged head threaded element 29 against the outer rear surface of the movable cylinder section 19 prevents any further rotatable movement of the movable cylinder section 19 relative to the fixed cylinder section 17 following adjustment.

Extending above the movable cylinder section 19 are a pair of spaced arms 35, 35 each of which have aligned pivot areas 37, 37 for pivotally mounting the power driven saw blade 15 through an associated pivot shaft, as is well known. Extending further above the pivot area 37 is an upper support 39 also having pivot area 41 for engaging an operating lever 42 that automatically rotates the upper blade guard 44 out of the way (see FIG. 2) as the power driven saw blade 15 is moved to a lower operational/engaged position relative to a workpiece. This is further explained in the aforementioned patents.

In general, the construction and operation of the fixed and movable cylinder sections 17, 19 and associated components are also disclosed in the aforementioned patents.

As previously indicated, the adjustable/bypassable bevel stop of the present invention functions to provide predetermined bevel stop settings, except when it is desired to override the predetermined bevel stop settings for angles less than or greater than the predetermined stop settings. For this purpose, the fixed cylinder section 17 includes bevel stops, generally identified at 43, 43 for engaging an extended index pin 45 mounted to the movable cylinder section 19, as shown in FIGS. 4-7 of the drawings.

As shown in the exploded rear perspective illustration of FIG. 3, each of the bevel stops 43 include a bevel stop element 48 shaped like a slotted rectangular block. Each of the bevel stop elements 48 is secured to the fixed cylinder 17 at spaced locations by a threaded adjusting screw 49. As shown in FIG. 3, the slot 52 in each bevel stop element 48 provides limited predetermined adjustment of the bevel stop elements 48 in order to adjust the fixed angle, typically located at 0° and 45°. The fixed angle is adjusted by using the slot 52 in each bevel stop element 48 to adjustably move each bevel stop element 48 relative to the threaded adjusting screw 49. As will be appreciated, this adjustment is necessary to make allowances for manufacturing variations. Thus, the adjustable fixed stop elements 48 enable a user to precisely set the stop elements 48 to the oft repeated angle such as 0° and 45°. the adjustment of the fixed stop elements 48, where the fixed angle is adjusted using the slot 52 in the fixed stop elements 48, must be distinguished from the bypass of the fixed stop elements 48, where an index pin 45 is selectively moved into and out of engagement with the fixed stop elements 48 in order to limit movement of the saw blade 15 within the limit of the fixed stop elements 48 or allow positioning of the saw blade 15 at an angle which is beyond the limit of the fixed stop elements 48. This bypassable feature will be described in further detail below.

Figure 5:
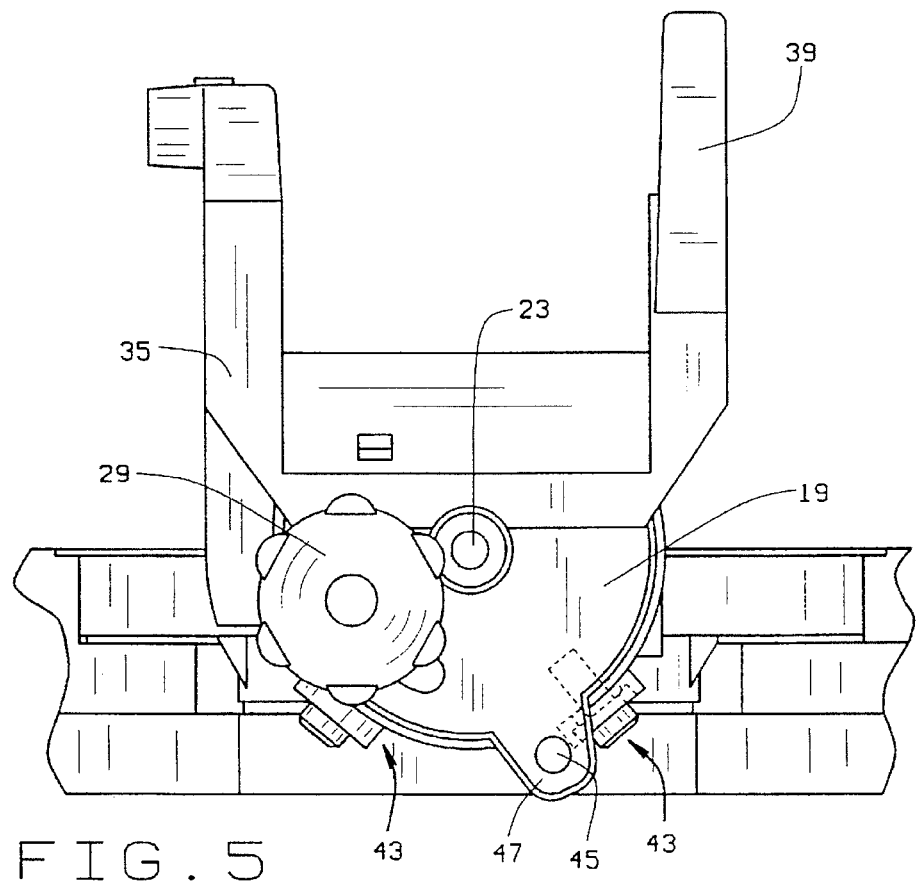
FIG. 5 is a partial rear elevational view of the adjustable/bypassable stop of the present invention set at a 0° bevel position.
Figure 6:
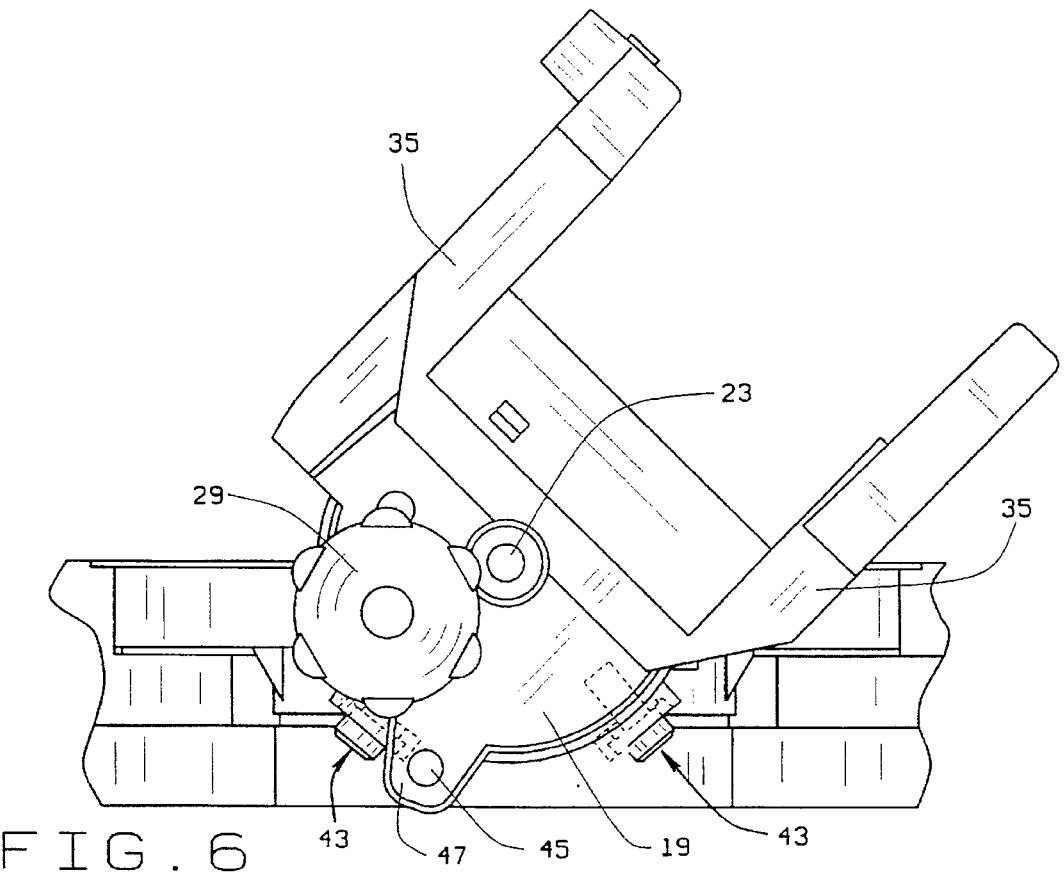
FIG. 6 is a partial rear elevational view of the adjustable/bypassable stop of the present invention set at a 45° bevel position.
Figure 7:
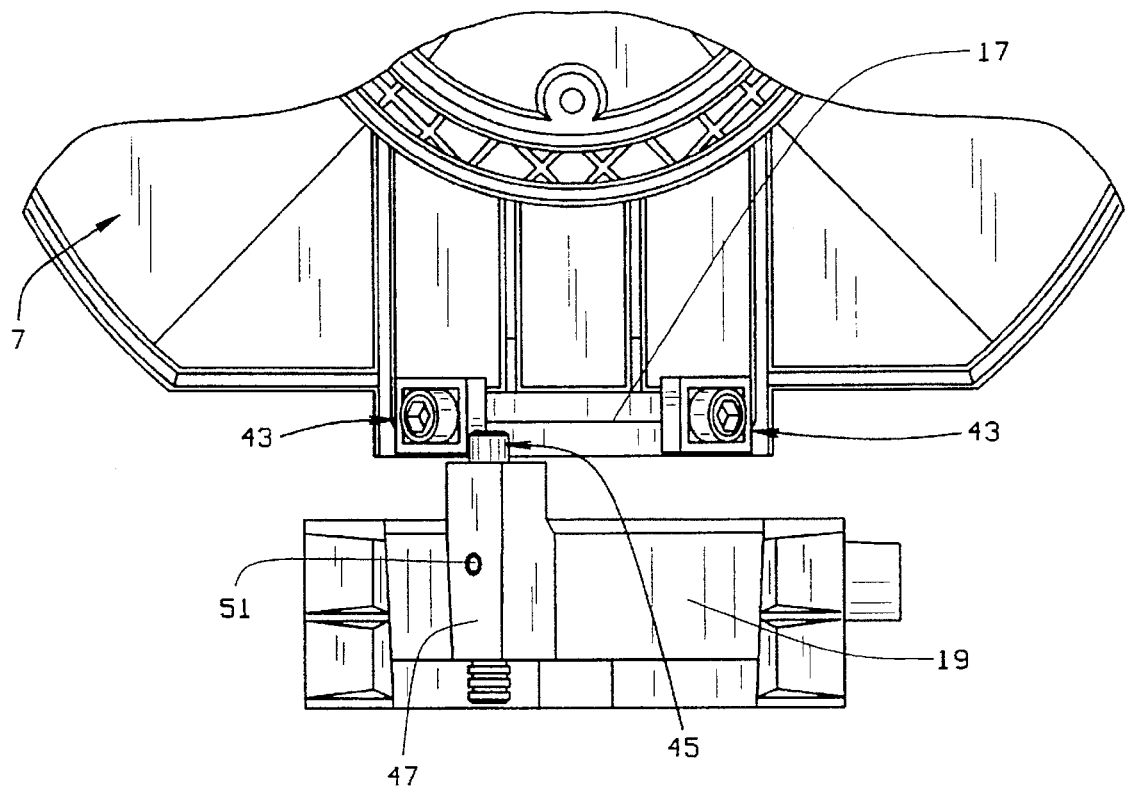
FIG. 7 is a fragmentary bottom plan view of the adjustable/bypassable stop of the present invention with an index pin in engaged position relative to the predetermined bevel stops.
Figure 8:
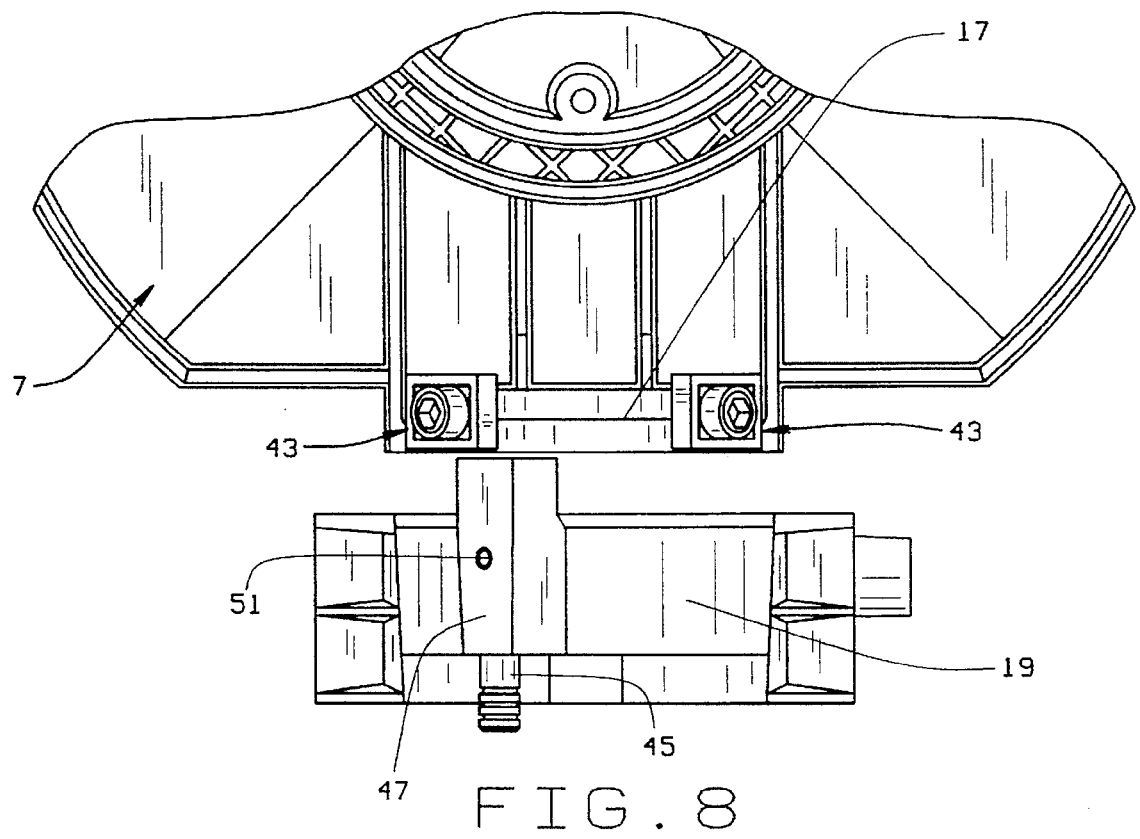
FIG. 8 is a fragmentary bottom plan view illustrating the adjustable/bypassable stop of the present invention with the index pin disengaged relative to the predetermined bevel stops.

As shown in FIGS. 5-8 of the drawings, the spaced positions where the bevel stops 43, 43 are located are preferably in the 0° bevel position as shown in FIG. 5 and the 45° bevel position as shown in FIG. 6. The 0° bevel position of FIG. 5 illustrates the power driven saw blade 15 in a 0° or non-bevel position relative to the turntable 7; however, by loosening the enlarged head threaded element 29 for rotating the movable cylinder section 19 relative to the movable cylinder section 17, the movable cylinder section 19 can be moved to the 45° bevel position as shown in FIG. 6 of the drawings. In each instance, the index pin 45 engages the bevel stops 43, 43 in the adjustable fixed bevel stop settings of 0° as shown in FIG. 5 and 45° as shown in FIG. 6.

As best seen in FIG. 4 of the drawings, the index pin 45 is mounted within a circumferential support 47 at the lower end of the movable cylinder section 19. The circumferential support 47 includes a complementary shaped inner circumferential wall 50 for receiving the index pin 45. In order to retain the index pin 45 within the circumferential support 47, a set screw 51 extends through the circumferential support 47 and is received within a recessed area 53 of the index pin 45. It will be noted that the set screw 51 is not tightened down onto the pin 45, but does engage spaced shoulders 55, 57 of the index pin 45 on opposite sides of the recessed area 53, depending upon the movement of the index pin 45. An O-ring 59 is mounted about the index pin 45 at a downstream location from the spaced shoulder 57 in order to provide a friction fit with the inner circumferential wall 50 of the circumferential support 47.

It will be seen from the above description that the index pin 45 is longitudinally movable for a distance corresponding to the spacing between the spaced shoulders 55, 57. This distance is sufficient to enable the index pin 45 to be moved between engaged and non-engaged positions relative to the bevel stops 43, 43. Specifically, when a user grasps the index pin 45 and longitudinally moves it to cause the shoulder 55 to engage the fixed set screw 51, the index pin 45 is moved outside of the circumferential support 47. This is the engaged position of the index pin 45 where its outer end 54, opposite the inner knurled/gripping end 46, extends outside of the circumferential support 47 for engagement with the bevel stops 43, 43.

When it is desired to disengage the index pin 45 relative to the bevel stops 43, 43, such as when angles less than 0° and greater than 45° are desired, the index pin 45 is moved to its non-engaged position where the spaced shoulder 57 of the index pin 45 engages the fixed set screw 51. At this non-engaged position, the index pin 45 does not extend beyond the circumferential support 47 at its inner end, and thus, there is no engagement with the bevel stops 43, 43.

It will be understood that the O-ring 59 causes frictional fit engagement with the inner circumferential wall 50 of the circumferential support 47 to hold the index pin 45 in a desired location. In this way, the O-ring 59 prevents the index pin 45 from moving in and out of the circumferential support 47 on its own. Thus, a user can selectively determine when to override or bypass the bevel stops 43, 43 by moving the index pin 45 to a non-engaged position or alternatively, to an engaged position where the index pin 45 is moved outside of the circumferential support 47.

From the foregoing, it will now be appreciated that the adjustable/bypassable bevel stop of the present invention provides adjustable bevel stop settings in the normal operation of the compound miter saw. However, when it is desired to make a bevel cut less than 0° or greater than 45°, for example, it is a relatively simple matter to disengage the index pin relative to the fixed bevel stops for movement to the desired bevel setting, all without re-adjusting the fixed bevel stops.

Because the bevel stops are adjustable, this provides several advantages. One is that the user can accurately set the stops to make up for small variations in manufacturing tolerances. The other is the user can set the stops to angles other than 0° to 45° if it is desired to make a cut that is perhaps a degree or two from the nominal angle. Thus, there are numerous advantages of the adjustable/bypassable bevel stop of the present invention as compared with prior art devices.

In view of the above, it will be seen that the several objects and features of this invention are achieved and other advantageous results obtained.

As various changes could be made in the above construction without departing from the scope of the invention, it is intended that all matter contained in the above description or shown in the accompanying drawings shall be interpreted as illustrative and not in a limiting sense.

We claim:

1. A compound miter saw comprising: a supporting frame; a turntable rotatably mounted on said supporting frame, said turntable including a saw blade slot extending through an upper planar surface and a fixed cylinder section mounted at one end of said turntable which extends generally transverse to the upper planar surface of said turntable; a movable cylinder section rotatably mounted to said fixed cylinder section, said movable cylinder section pivotally mounting a power driven saw blade that moves along a predetermined path from an upper raised position to a lower operational position that includes the saw blade slot in said turntable;

bevel adjustment means for selectively rotatably moving said movable cylinder section relative to said fixed cylinder section in order to provide bevel adjustment of said power driven saw blade relative to said turntable; and adjustable/bypassable bevel stop means for predetermined bevel stop settings as well as for over-riding such bevel stop settings when angles beyond the bevel stop settings are desired without re-adjusting said bevel stop means, the adjustable/bypassable bevel stop means including bevel stops mounted on said fixed cylinder section for engaging an index pin mounted on said movable cylinder section when the bevel adjustment means is operated for positioning the movable cylinder section between the bevel stop settings, said index pin being selectively movable into and out of engagement with said bevel stops for movement of the movable cylinder section beyond the bevel stop settings, the index pin being longitudinally movable between an engaged and disengaged position relative to the bevel stop in a direction generally transverse to the plane of movement of the movable cylinder section relative to the fixed cylinder section.

2. The compound miter saw as defined in claim 1 wherein the predetermined bevel stop settings are 0° and 45°.

3. The compound miter saw as defined in claim 1 wherein the index pin is movable to a position of disengagement relative to said bevel stops for bevel adjustment beyond the bevel stops and without re-adjustment of the bevel stops.

4. The compound miter saw as defined in claim 1 including a fastener for limiting the range of movement of the index pin from an engaged to non-engaged position and a friction engagement element tier engaging said index pin to hold the index pin in the desired engaged or non-engaged position.

5. The compound miter saw as defined in claim 1 wherein the movable cylinder section includes spaced and upwardly extending arms for pivotally mounting said power driven saw blade.

6. The compound miter saw as defined in claim 1 wherein said bevel adjustment means includes an adjusting knob extending through an arcuate slot in said movable cylinder section for cooperative threaded engagement with a complementary threaded nut formed in said fixed cylinder section.

7. A compound miter saw comprising:

a supporting frame;

a turntable rotatably mounted on said supporting frame and including a saw blade slot;

a power driven saw blade pivotally mounted on said turntable for movement in a first direction along a predetermined path from an upper raised position to a lower operational position that includes the saw blade slot in said turntable, said power driven saw blade also pivotally mounted on a movable cylinder section that rotates generally transversely to the rotatably mounted turntable, said movable cylinder section cooperating with a fixed cylinder that is mounted to said turntable; miter adjustment means for selectively rotatably moving said turntable and power driven saw blade relative to said supporting frame in order to provide pre-set miter adjustment positions;

bevel adjustment means for selectively rotatably moving said power driven saw blade about said moving cylinder section in order to provide pre-set bevel adjustment positions; and adjustable/bypassable bevel stop means for predetermined bevel stop settings as well as for over-riding such stop settings when bevel angles beyond the bevel stop settings are desired without re-adjusting said bevel stop means, the fixed cylinder section including bevel stops which are engaged by an index pin mounted on the movable cylinder section when the bevel adjustment means is operated, the index pin being selectively movable into and out of engagement with the bevel stops, the index pin being longitudinally movable between an engaged and non-engaged position relative to said bevel stops in a direction generally transverse to the plane of movement of the movable cylinder section relative to the fixed cylinder section.

8. The compound miter saw as defined in claim 7 wherein the predetermined bevel stop settings are 0° and 45°.

9. The compound miter saw as defined in claim 7 wherein the index pin is movable to a position of disengagement relative to said bevel stops for bevel adjustment beyond the bevel stops and without re-adjustment of the bevel stops.

10. The compound miter saw as defined in claim 7 and including a circumferential supporting surface provided on the movable cylinder section for the index pin.

11. The compound miter saw as defined in claim 10 and including a set screw extending through the circumferential supporting surface for location in a recessed area of the index pin between spaced shoulders for retaining the index pin while permitting longitudinal movement of the index pin between the spaced shoulders for engagement and non-engagement with the bevel stops, and an O-ring mounted about the index pin for frictional engagement with the circumferential supporting surface for holding the index pin in the desired engaged or non-engaged position relative to the bevel stops.

* * * * *

UNITED STATES PATENT AND TRADEMARK OFFICE
CERTIFICATE OF CORRECTION

PATENT NO. : 5,623,860
DATED : April 29, 1997
INVENTOR(S) : Keith R. Schoene, et. al.

It is certified that error appears in the above-indentified patent and that said Letters Patent is hereby corrected as shown below:

Column 9, Line 26
insert after "blade" -to said turntable-

Signed and Sealed this

Fourth Day of August, 1998

Attest:

BRUCE LEHMAN

*Attesting Officer*      *Commissioner of Patents and Trademarks*